United States Patent [19]
Olivares et al.

[11] Patent Number: 5,886,140
[45] Date of Patent: Mar. 23, 1999

[54] CHEMICAL DEPLETION PROCESS TO SUBSTANTIALLY REMOVE RESIDUAL MONOMERS IN EMULSION POLIMERIZATION PROCESSES

[75] Inventors: Margarito Albarran Olivares, Toluca Estado De Mexico; Francisco J. Alvaro Archundia, Santiago Tiangistenco Edo. de mex; Francisco López Serrano Ramos, Metepec Estado de Mexico, all of Mexico

[73] Assignee: Centro De Investigacion Y Desarollo Technologico S.A. de C.V., Edo De Mexico, Mexico

[21] Appl. No.: 791,314

[22] Filed: Jan. 30, 1997

[51] Int. Cl.[6] ........................................................ C08F 6/16
[52] U.S. Cl. ........................... 528/485; 528/486; 528/487; 528/491
[58] Field of Search ..................................... 528/485, 486, 528/487; 252/160

[56] References Cited

U.S. PATENT DOCUMENTS 4,205,161 5/1980 Wiest et al. .............................. 528/487
5,087,676 2/1992 Heider et al .............................. 526/93

OTHER PUBLICATIONS

Hawley's Condensed Chemical Dictionary, 11th Ed., p. 1257 Van Nostrand Reinhold, New York, 1987.

*Primary Examiner*—Edward J. Smith
*Attorney, Agent, or Firm*—Carmen Pili Curtis

[57] ABSTRACT

A process has been developed to substantially reduce the residual monomer resulting at the end of the emulsion polymerization reaction. The process consists in submitting the latex to a redox process after the polymerization reaction. The recommended environment consists of vinyl monomers and/or conjugated dienes homo or copolymer that has a residual monomer content not in excess of 100,000 ppm at the end of the reaction. After the chemical depletion, residual monomer contents of 50 to 1000 ppm are achieved in a process that lasts from 0.5 to 5 hours at most.

14 Claims, No Drawings

CHEMICAL DEPLETION PROCESS TO SUBSTANTIALLY REMOVE RESIDUAL MONOMERS IN EMULSION POLIMERIZATION PROCESSES

BACKGROUND OF THE INVENTION

For several decades numerous processes have been known in the art to prepare various monomer emulsions through which numerous polymer compounds have been produced based on homopolymers, copolymers and terpolymers that involve vinyl monomers and/or conjugated dienes. The commonly used components in emulsion polymerization are monomers which are dispersed in water through emulsifiers, that can be ionic, non-ionic or amphoteric, dispersing agents, transfer agents, pH regulators, electrolytes, inhibitors and initiator. The initiator can be water soluble or organic phase soluble. In order to reduce the half life time of the initiator, reducing agents can be used.

The processes can be defined in several ways. The oldest ones were batch processes classified as cold or hot processes. The cold processes are carried out at low temperatures (about 5 degrees C.) and the hot processes are carried out at a reaction temperature above 50 degrees C. In some cases, the reaction must be stopped within low conversion ranges (from 50 to 75%) in order to obtain appropriate rubber characteristics. The batch processes are the processes in which all the ingredients are charged at the beginning of the reaction. There are semi-batch processes, in which some of the ingredients are charged at the beginning of the reaction and the remaining part of the ingredients is added at predetermined times.

The continuous processes consist of an input stream of polymerization ingredients and an output stream of the product. In the case of the continuous processes, a reactor cascade is usually required to achieve high conversion rates.

In the past few years, environmental regulations have been focusing their attention to the reduction of residual monomers and the so-called organic volatile compounds such as styrene, acrylonitrile, vinyl chloride, etc.

Independently of the reaction process, the final monomer conversion into polymer is never 100%, which implies that there is residual monomer occluded in the emulsion polymer particles.

Traditionally, the residual monomer removal is carried out stripping said monomer through vacuum and/or steam. Among the disadvantages related to the use of stripping, there is the fact that it is a highly energy consuming process (vacuum and steam). The equipment in which the stripping is carried out fouls itself considerably which causes productivity reduction, together with pollution problems caused by the material adhered to the equipment.

During the vacuum application, foam is generated and to prevent foam formation antifoam agents are added which negatively affect the functional characteristics of the latex (film formation, solvent resistance, adhesiveness, brightness, etc.). There is also the polymer destabilization and degradation problem due to the large periods of time required for the stripping. The water removed during the stripping contains residual monomer and latex, and this makes the treatment of residual water necessary in order to fulfill the ecological regulations that are becoming stricter every day.

For instance, in the U.S. Pat. No. 4,130,527 it is indicated that, in general, the organic volatile compounds are removed from the latex, using water steam, gases, or gas mixtures. In this technology it is established that the volatile compound removal speed is not controlled by the particle outlet diffusion speed, but by the speed at which the gas can contact the polymer particle to strip the volatile material to the aqueous phase and then to the gas phase. Some of the factors that affect the design of this type of equipment are: a) foam production during the process; b) colloidal instability resulting from temperature and mechanical stress, and c) the high viscosities caused by the product concentration. In the U.S. Pat. No. 4,529,753 it is stated that there are various types of devolatilizers commercially available, from the ones that operate in batches to the ones that operate in continuous processes and that have equipment cascades with countercurrent or crossed gas flows. Another equipment that has been described is the one referring to stripping columns that form a fine latex film, under reduced pressure conditions, to increase the contact surface with the stripping gas (Monomer Removal from Latex, S.M. England publication, Dow Chemical Co. Midland, Mich. 48640 U.S.A.). It is obvious that these equipments are expensive and because of the process there is an important material loss caused by coagulation.

In the U.S. Pat. No. 4,301,264, an "Emulsion Polymerization Process" is described in which the oxidizing system is made up of hydroperoxides and the reducing agent system consists of amines. In this patent, the oxidizing agent is charged to the emulsion since the polymerization process.

A "steam and chemical stripping" method is also reported. In said method, low pressure conditions are used. The oxidizing system is a hydrogen peroxide, a diazo or azo compound and the reducing agent is a sulfur compound.

SUMMARY OF THE INVENTION

A process to substantially deplete the residual monomer from the emulsion homopolymerization, copolymerization or terpolymerization reaction resulting in lower than 100% conversions. Said process is characterized because the latex is submitted to a post-polymerization through a redox treatment. This treatment consists in the addition of the redox system; the ratio used is 0.01–0.5/0.01–0.5 percent by weight, based on 100 parts of polymer. The process is carried out within a 50–90 degrees C. temperature range and under atmospheric pressure. The depletion time in which the maximum residual monomer reductions is achieved is within a 0.3–5.0 hour period of time, in the reactor. The process is also characterized because the redox system continues its depletion action in the latex during the storage period before being used.

The herein described process is applied in emulsions that involve vinyl monomers and conjugated dienes that contain from 2,000 to 100,000 ppm residual monomer, and reductions of said content to 50 to 1000 ppm are obtained.

The object of the present invention offers preferably a process that instead of trying to remove the residual monomer by conventional techniques, permits its polymerization in the same emulsion, without negatively affecting the functional characteristics of the latex and at a temperature such that the treated latex does not degrade or coagulate, avoiding the steps of steam or gas stripping, latex concentration of known processes and then the treatment of residual waters and emissions to the environment resulting from said processes.

A further object of the present invention is to offer a more productive and economical process that because its uses a oxidizing and reducing component system allows a more efficient process reducing considerably its manufacturing time, since the depletion can be carried out in the same reactor where the polymerization took place or separately in a stirred tank at room temperature and under normal pressure conditions in which the residual monomer is reduced to levels that are accepted by international environmental norms.

DETAILED DESCRIPTION OF THE INVENTION

TRADITIONAL PROCESSES
STEAM STRIPPING DISTILLATION

In conventional technologies to remove volatile monomers that did not react during the polymerization process, a steam stripping process is carried out in order to desorb the still free monomer.

The low water solubility of the monomer, for instance (butadiene, styrene, vinyl chloride, etc.) provokes that most of the residues of said monomers are found in the polymer colloidal particles. A controlled balance is established between the continuous phase (water) and the particles. Through vacuum and high temperatures, water and part of the dissolved organic compounds are distilled.

It is necessary to literally distill several times the original volume of water of the emulsion to reduce the amount of volatile compounds. It must be mentioned that this part of the process is long (at least 8 hours), extensive as far as the use of energy is concerned (steam and electricity), and contributes to a great extent to the emanation of volatile compounds to the atmosphere. Besides it provokes the dilution of latex, its tendency to degrade and soils the equipments when the operation is carried out.

On the other hand, during the distillation, small latex strippings (a few drops would be enough) towards the distillates produce effluent contamination which is very difficult to eliminate, since the average size of the particles is 200 nanometers said particles can be removed through very sophisticated and economically unsound methods.

CONCENTRATION

Because the solid content of the latex diminishes (part of the steam condensates to heat the latex) in the distillation step, a concentration step is necessary for two main reasons:

a) The cost of the freight is negatively affected by the unnecessary water transportation.

b) During coat and adhesive application, the clients' formulations do not withstand large amounts of water, mainly because of the long drying periods of time (high energy consumption) required.

Thus, once the distillation step is over, an additional latex concentration step is required. Vacuum is applied and the latex is heated to higher temperatures in order to remove water through evaporation.

Also, during this process large amounts of "polluted water" are generated, and said waters must be treated to fulfill the effluent disposal regulations. Besides, coagulated latex encrusts on the equipment, and this causes idle times because of the equipment cleaning required.

It is worth mentioning that the drastic prolongation of reaction cycles and the addition of more initiator could result in conversions close to 100%, but the process is not profitable (very low productivity) and the product is functionally is affected by secondary reactions such as cross-linking.

Traditionally, the aqueous emulsion polymerization of vinyl monomers and/or conjugated dienes is carried out polymerizing the monomers in presence of emulsifiers, molecular weight modifier, electrolytes, buffers, antioxidants and initiators. Examples of initiators that are water soluble and that can be used are ammonium, potassium or sodium persulfates, as well as perborates, peracetates, peroxides, alkali metal percarbonates (for instance, sodium or potassium percarbonate), hydrogen peroxide; said initiators can act alone or activated by a water soluble reducing agent, among which the following ones can be mentioned: water soluble azo initiators, such as 2,2'azo bis (2 amidine-propane) dihydrochloride, 4,4'azo bis 4 cyanopentaenoic acid, etc. Examples of organic phase soluble initiators are organic peroxides or hydroperoxides, such as diterbutyl peroxide, benzoyl peroxide, lauryl peroxide, etc., azo initiators such as 2,2'azo bis isobutyronitrile, 2,2'azo bis-(2 methyl butyronitrile), etc., peroxyester such as t-butyl-peroxyneodecanate, t-butyl-peroxypivalate, t-butyl proxy 2 ethyl hexanoate, etc. The above mentioned initiators, when they are used as main polymerization initiators, are added in amounts that range between 0.05 and 0.5% by weight with regard to the total weight of the monomer mixture. In this invention, the redox system is used in amounts within the range of 0.01 to 0.5% by weight based on 100 parts of polymer, for the oxidizing agent and the reducing agent. Herein, the expression "oxidizing agent" refers to an agent or a mixture of two or more of said additives. The same applies to the expression "reducing agent". In the redox system, in the oxidizing part a peroxyester type initiator soluble in the organic phase may be present.

Appropriate reducing agents include ferrous complexes carboxylic acids, such as $C_5$–$C_4$ carboxylic acids cobalt, zinc, copper or nickel or reducing sugars or their derivatives, such as mannitol or gluconates. There can also be compounds that contain sulfur, such as alkaline sulfates or bisulfates or alkaline earth sulfates. Examples of these agents are sodium or formol sulfoxylate, dextrose, fructose, sodium bisulfite, sodium metabisulfite, ascorbic acid, erythorbic acid, etc.

NEW PROCESS

Hereinbelow the process object of the present invention will be described:

CHEMICAL DEPLETION

In order to reduce practically all the monomers that did not react in the emulsion polymerization processes, an alternative system is used that produces more active free radicals through redox reactions. The new radicals must produce more polymer chains without negatively affecting the product functionality. This is achieved with the above described systems which have the capacity to selectively activate the residual monomer and not the emulsion polymer.

In general terms, the redox systems produce free radicals that are very reactive with regard to the previously formed polymer, which leads to cross-linking reactions (net formation) that lower the flexibility of the material, negatively affecting its functionality. The novel characteristic of the innovation herein described is to selectively control the transfer reactions to the polymer in order to achieve conversions close to 100% through the use of the abovementioned redox system.

The "Chemical depletion" process object of the present invention presents advantages because, on the one hand it eliminates polluting undercurrents, which instead of polluting become part of the product, and this increases the yield of the reaction and thus the productivity of the process. The productivity achievements are reflected in an important reduction of total manufacturing times of the emulsion product, because the steam stripping and concentration steps are eliminated. In general terms, the net depletion time can be lowered 65% diminished and the distillation and concentration time can be lowered 100% (from 15–30 hours to 0 hours). As the consequence of what has just been said, the services consumption (steam, electricity, cooling water) is reduced in the same proportion.

Hereinbelow the invention shall be described in the following examples in order to explain said invention but not to limit its scope.

EXAMPLE 1

A stirred reactor is charged with a mixture of styrene and butadiene monomers and submitted to polymerization at temperatures ranging from 45 degrees C. to 60 degrees C. An emulsion (latex) is obtained with a residual monomer content from 10,000 to 30,00 ppm; then additives are added such as pH stabilizers, an aqueous vehicle in minimum concentrations of 0.1 to 0.3% by weight, then the polymer mixture temperature is increased from 60 degrees C. to 80 degrees C.; and a redox agent system is added in which the oxidizing agent is selected from diacyl peroxides, peroxydicarbonates, peroxyesters or hydroperoxides or in mixture of any said agents with ter-butyl peroxy 2 ethyl hexonoate peroxyesters or hydrogen peroxide; and a reducing agent selected from sulfoxylated metal complexes, such as formol and zinc sulfoxylate of formol and iron sulfoxylate or mixed with carboxylic acids such as ascorbic acid, erythorbic, citric, tartaric acid, etc.; in concentration of 0.01 to 0.5 parts by weight per 100 parts by weight of latex, during a reaction period of 1 to 3 hours. Then, a residual monomer content within a 50–500 ppm range is determined.

EXAMPLE 2

Following the technique used in example 1, the mixture temperature is increased to 70 degrees C. and then a redox agent system is added based on benzoyl peroxide and potassium persulfates as oxidizing agents with a mixture of sugars such as dextrose, fructose, glucose or galactose, in a concentration of 0.01 to 0.1 parts by weight per 100 parts by weight of latex, during a depletion time of 1 to 3 hours. The result is a 50 to 200 ppm monomer residue.

EXAMPLE 3

Following the same technique as in example 1, the temperature is increased to 70 degrees C., and the redox system is slowly added, based on terbutyl hydroperoxide, ammonium persulfate and erythorbic acid in a ratio of 0.07 parts per 100 parts of polymer, during a depletion time of 1 to 2 hours. A residual monomer content of 100 to 200 ppm is obtained.

EXAMPLE 4

Following the same technique as in example 1, a redox system based on formol and zinc sulfoxylate, t-butyl peroxy 2 ethyl hexanoate and t-butyl peroxy benzoate is added in a ratio of 0.15 parts per 100 parts of polymer. After 4 to 5 hours a 50 to 120 residual monomer content is obtained.

While the present invention has been described in conjunction with specific embodiments, many alternatives, modifications and variations thereof will be apparent to those of ordinary skill in the art. All such alternatives, modifications and variations are intended to fall within the spirit and scope of the present invention, which is only to be limited by the following claims.

We claim:

1. A chemical depletion process to substantially remove residual monomers in an emulsion polymerization process comprising polymerizing a vinyl monomer mixture and/or conjugated dienes at a temperature ranging from about 45° C. to about 60° C., in a reactor to obtain a latex emulsion having a residual monomer content within a range of from about 2000 to about 100,000 ppm, the depletion process comprising the steps of
   a) contacting the latex in the reactor with a redox system consisting of:
      i) an oxidizing agent generator of free radicals having high activity selected from the group consisting of peroxides, peroxydicarbonates, peroxyesters and hydroperoxides with the proviso that when said oxidizing agent is a peroxyester, then said agent optionally further contains terbutyl peroxide, terbutyl hydroperoxide, potassium persulfate or ammonium persulfate, and with the further proviso that when said oxidizing agent is terbutyl hydroperoxide, then ammonium persulfate is present and with the further proviso that when the oxidizing agent is benzoyl peroxide then potassium persulfate is present; and
      ii) a reducing agent selected from the group consisting of complexes of formol and zinc sulfoxylate, reducing sugars or their acid derivatives and $C_5$–$C_4$ carboxylic acids;
   b) heating and stirring the resulting mixture at a stirring temperature of from about 50° C. to about 90° C. during a depletion time of from about 0.3 to about 5 hours to obtain a latex having a residual monomer content of at least about 50 to about 1000 ppm.

2. The chemical depletion process according to claim 1 wherein said redox system is in a weight ratio of about 0.01 to about 0.5/0.01 to about 0.5% oxidizing-reducing agent per 100 parts of the polymer.

3. A chemical depletion process according to claim 1 wherein the residual monomer content of the resulting polymer from step (b) is further reduced by the active continuing reducing action of the redox system even during the storage of the latex such that the residual monomer is 10% to 50% less than that of the residual monomer content of the resulting polymer.

4. The chemical depletion process according to claim 1 wherein the reducing agent of the redox system is a complex of formol and zinc sulfoxylate.

5. The chemical depletion process according to claim 1 wherein the reducing agent of the redox system is a mixture of carboxylic acid(s) and a complex of formol and zinc sulfoxylate.

6. The chemical depletion process according to claim 1, wherein the reducing sugar is selected from the group consisting of dextrose, fructose, glucose and galactose.

7. The chemical depletion process according to claim 1, wherein the oxidizing agent of the redox system are peroxyester compounds.

8. The chemical depletion process according to claim 7 wherein the reducing agent of the redox system further contains a member selected from the group consisting of potassium persulfate, ammonium persulfate, terbutyl peroxide and terbutyl hydroperoxide.

9. The chemical depletion process according to claim 5 wherein the carboxylic acid is selected from the group consisting of erythorbic, citric and itaconic acid.

10. The chemical depletion process according to claim 7, wherein the peroxyester is selected from the group consisting of terbutyl peroxy-neodecanoate, terbutyl peroxypivalate, terbutyl peroxy 2-ethyl hexanoate and terbutyl peroxy benzoate.

11. The chemical depletion process according to claim 1, wherein the process is conducted from about 0.5 to about 5 hours.

12. The chemical depletion process according to claim 1, wherein the reducing sugar derivative is selected from the group consisting of mannitol and gluconate.

13. The chemical depletion process according to claim 5, wherein the carboxylic acid is selected from the group consisting of erythorbic acid, ascorbic acid, citric acid, tartaric acid, and itaconic acid.

14. The chemical depletion process according to claim 1 wherein the monomer mixture and/or conjugated diene is a mixture of styrene and butadiene monomers.

* * * * *